US010602315B2

(12) United States Patent
Vijayvergiya

(10) Patent No.: US 10,602,315 B2
(45) Date of Patent: Mar. 24, 2020

(54) SYSTEM AND METHOD FOR PROVIDING A PLATFORM FOR CREATING, BROWSING AND SEARCHING A JOURNAL OF ACTIVITIES OF A USER

(71) Applicant: Arun Vijayvergiya, San Francisco, CA (US)

(72) Inventor: Arun Vijayvergiya, San Francisco, CA (US)

( * ) Notice: Subject to any disclaimer, the term of this patent is extended or adjusted under 35 U.S.C. 154(b) by 399 days.

(21) Appl. No.: 15/372,596

(22) Filed: Dec. 8, 2016

(65) Prior Publication Data
US 2017/0169041 A1 Jun. 15, 2017

Related U.S. Application Data
(60) Provisional application No. 62/264,857, filed on Dec. 9, 2015.

(51) Int. Cl.
H04W 4/029 (2018.01)
G06F 16/27 (2019.01)
G06F 16/2458 (2019.01)

(52) U.S. Cl.
CPC ........ *H04W 4/029* (2018.02); *G06F 16/2477* (2019.01); *G06F 16/27* (2019.01)

(58) Field of Classification Search
CPC .. G06F 16/2477; G06F 16/29; G06F 16/2379; G06F 16/9537; G06F 1/203; G06F 16/27; H04L 2012/40273; H04W 4/029
USPC ........................................................ 707/737
See application file for complete search history.

(56) References Cited

U.S. PATENT DOCUMENTS

2013/0345957 A1* 12/2013 Yang .................. G06N 5/02
701/300
2014/0039840 A1* 2/2014 Yuen .................. A61B 5/6838
702/189

* cited by examiner

Primary Examiner — Evan Aspinwall
(74) Attorney, Agent, or Firm — Neal Marcus

(57) ABSTRACT

A system is disclosed for providing a platform for creating, browsing and searching a journal of a user's activities. The system comprising a data storage area to store: a user database, wherein information pertaining to one or more users is stored; a location group objects database, wherein one or more location group objects are stored, each object comprising a timestamp, coordinates and motion status of a user; a points of interest database wherein one or more location points of interest of the user are stored, the points of interest comprise data relating to the user from one or more data sources on a network that index data based on time; and one or more servers coupled to the user database, location group objects database and points of interest database via the network, the one or more servers programmed to execute computer program modules, the computer program modules comprising: a tracker engine configured to (1) receive and process data from one or more sensors sensing the location of the user and (2) generate a plurality of location group objects that comprise a time, coordinates and motion status of the user; and an annotation engine configured to assign a physical location to each location group object.

17 Claims, 4 Drawing Sheets

[START TIMESTAMP, END TIMESTAMP, COORDINATES, VISIT / TRANSIT]

{
9:00AM, 9:30PM, 42, 75, VISIT
9:30AM, 11:15AM, 42, 71... 101, 109, TRANSIT
• • •
12AM, 1AM, 56, 150, VISIT
• • •
5:30PM, 7PM, 75, 120... 150, 175, TRANSIT
}

LOCATION GROUP OBJECTS

FIG. 4

SYSTEM AND METHOD FOR PROVIDING A PLATFORM FOR CREATING, BROWSING AND SEARCHING A JOURNAL OF ACTIVITIES OF A USER

CROSS-REFERENCE TO RELATED APPLICATIONS

This application claims priority to U.S. Provisional Application No. 62/264,857 filed Dec. 9, 2015, entitled "System and Method For Providing a Platform For Creating, Browsing and Searching a Journal Of Activities of a User" which is incorporated by reference herein.

FIELD OF THE INVENTION

The present invention relates to a system and method for providing a platform for creating, browsing and searching a journal of a user's activities.

BACKGROUND OF THE INVENTION

An individual's life is made up of experiences that extend over many years. These experiences may include family gatherings, vacations, work functions and outings and other life experiences at various locations. Individuals like to commemorate such life experiences with photographs (also referred to as pictures), videos, etc. and share such photographs and videos directly with others via email or text or via social networks such as Facebook and Instagram (to name a few). For example, an individual may take one or more photographs of several friends at a birthday party in New York City and share the photographs with friends on Facebook. Over time, the individual has accumulated a large quantity of data representing these life experiences. However, the data is generally located at multiple disparate locations with no meaningful way to access, search or construct a timeline of an individual's life experiences.

SUMMARY OF THE INVENTION

A system and method for providing a platform for creating, browsing and searching a journal of a user's activities are disclosed.

In accordance with an embodiment of the present disclosure, a system is disclosed for a method is disclosed of providing a platform for creating, browsing and searching a journal of a user's activities, wherein the method is implemented in one or more servers on a network programmed to execute the method, the method comprising: receiving and processing data from one or more sensors to determine a location of a user throughout a journey of the user; generating a plurality of location group objects based on the data from the one or more sensors, wherein each object comprises a time stamp, coordinates and/or motion status of the user during the user's journey; and assigning a physical location or place the location group objects.

In accordance with yet another embodiment of the disclosure, a system is disclosed for providing a platform for creating, browsing and searching a journal of a user's activities comprising: a data storage area to store: a user database, wherein information pertaining to one or more users is stored; a location group objects database, wherein one or more location group objects are stored, each object comprising a timestamp, coordinates and motion status of a user; a points of interest database wherein one or more location points of interest of the user are stored, the points of interest comprise data relating to the user from one or more data sources on a network that index data based on time; and one or more servers coupled to the user database, location group objects database and points of interest database via the network, the one or more servers programmed to execute computer program modules, the computer program modules comprising: a tracker engine configured to (1) receive and process data from one or more sensors sensing the location of the user and (2) generate a plurality of location group objects that comprise a time, coordinates and motion status of the user; and an annotation engine configured to assign a physical location to each location group object.

In yet another embodiment of the disclosure, a system is provide for providing a platform for creating, browsing and searching a journal of a user's activities comprising: a data storage area to store: a user database, wherein information pertaining to one or more users is stored; a location group objects database, wherein one or more location group objects are stored, each object comprising time, coordinates and motion status of a user; a points of interest database wherein one or more location points of interest of the user are stored; and memory for storing computer program modules and one or more processors for executing the computer program modules, the computer program modules comprising: a tracker engine configured to (1) receive and process data from one or more sensors sensing the location of the user and (2) generate a plurality of location group objects that comprise a time, coordinates and motion status of the user; and an annotation engine configured to assign a physical location to each location group object.

BRIEF DESCRIPTION OF THE DRAWINGS

FIG. 4 depicts a chart illustrating an example list of location group objects.

DETAILED DESCRIPTION OF THE INVENTION

Figure 1:
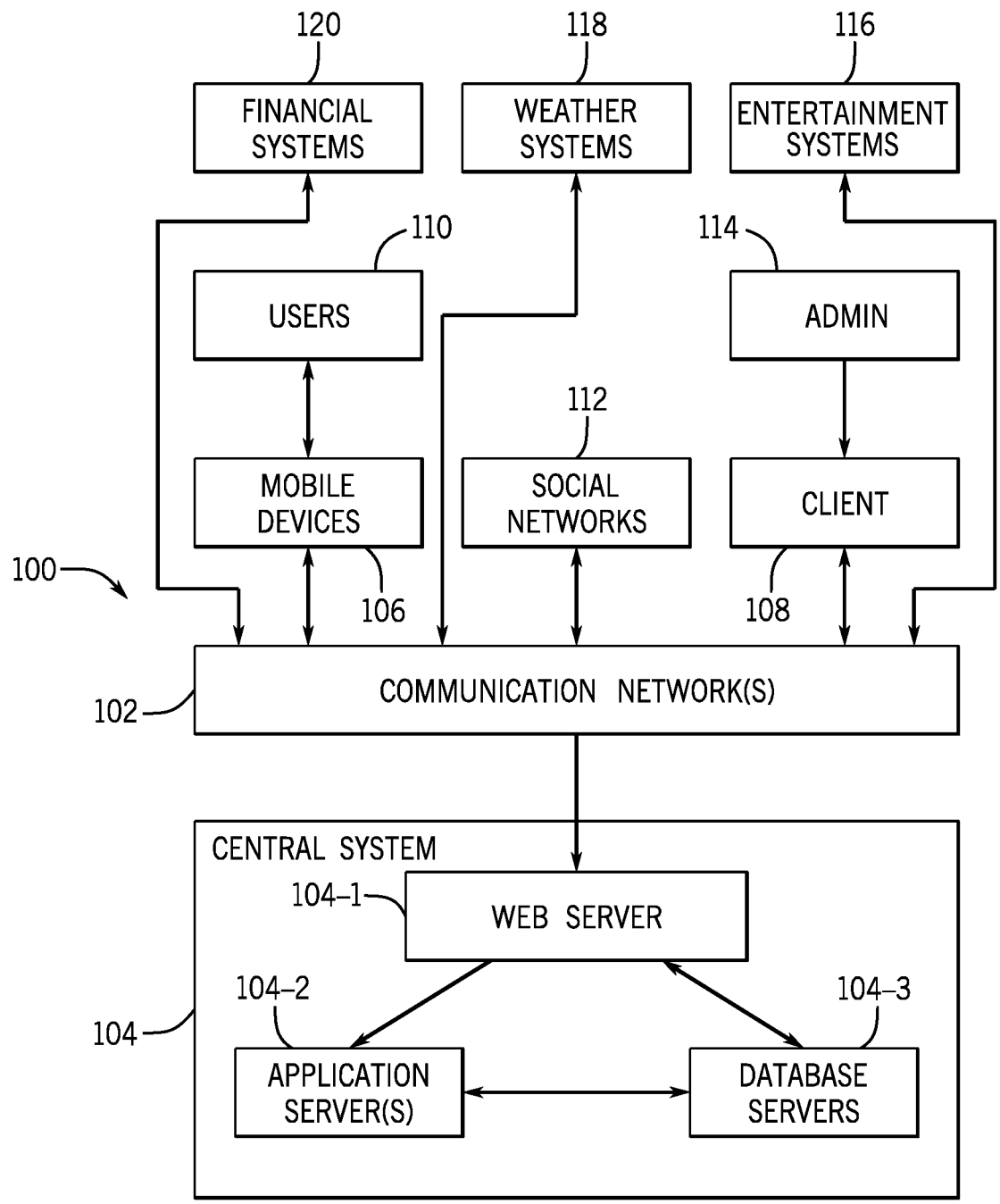
FIG. 1 depicts a block diagram of an example system in which a platform for creating, browsing and searching a journal of a user's activities operates.

FIG. 1 depicts a block diagram of an example system 100 in which a platform (200 below) for creating, browsing and searching (in real time) a journal of a user's activities operates. In brief, the platform takes advantage of sensors' data on a user mobile device such as GPS coordinates, motion sensor activity and photo, video and other metadata including, checkins, email and text (to name a few) to construct a user location and activity history. Based on this location history, the platform will assign a physical location or place to all of the user's "visits" by accessing a points of interest (POI) database to those established by Foursquare, Google, Facebook, Instagram or any other data source (on a network) that indexes data based on time. This is described in more detail below.

System 100 comprises communication network(s) 102 in the center of FIG. 1 that links various computer systems and clients to each other. System 100 further comprises central system 104, mobile devices 106 (as a particular client type) and client 108 that communicate with central system 104 via communication network(s) 102. Mobile devices 106 communicate wirelessly via carrier networks as known to those skilled in the art. Client 108 may communicate with central system 104 via a wired or wireless connection as known those skilled in the art. Communication network(s) 102 may be the Internet, LAN or combination of both.

Central system 104 includes one or more servers such as web server 104-1, application server(s) 104-2 and database server(s) 104-3 as known to those skilled in the art. Each of these servers includes several internal components such as one or more processors (central processing units), memory, storage drives, one or more network or other interfaces, optional video cards, known to those skilled in the art. Each server further includes one or more databases, software modules and applications (e.g., browser) as known to those skilled in the art. In particular, central system 104 along with each of mobile devices 106 comprise the platform for creating, browsing and searching a journal of a user's activities as described in more detail below.

Mobile devices 106 may be smartphones, cellular telephones, tablets, PDAs, or other devices equipped with industry standard (e.g., HTML, HTTP etc.) browsers or any other application having wired (e.g., Ethernet) or wireless access (e.g., cellular, Bluetooth, RF, WIFI such as IEEE 802.11b etc.) via networking (e.g., TCP/IP) to nearby and/or remote computers, peripherals, and appliances, etc. TCP/IP (transfer control protocol/Internet protocol) is the most common means of communication today between clients or between clients and systems (servers), each client having an internal TCP/IP/hardware protocol stack, where the "hardware" portion of the protocol stack could be Ethernet, Token Ring, Bluetooth, IEEE 802.11b, or whatever software protocol is needed to facilitate the transfer of IP packets over a local area network. Each mobile device includes several internal components a processor (central processing unit), memory, storage drives, operating system (OS such as iOS, Android), applications, one or more interfaces, optional video cards as known to those skilled in the art. Each mobile device 102 also includes global positioning (GPS) and/or other location based technology as known to those skilled in the art. Users 110 can employ applications on mobile devices 106 to access websites such as social networks 112 (e.g., Foursquare, Facebook, Twitter Instagram etc.), and other data as known to those skilled in the art. System 100 further includes other systems that contain time based information that relate to a user's life including (for example) entertainment systems 116, weather systems 118 and financial systems 120. Entertainment systems 116, weather systems 118 and financial systems 120 communicate with central system 104 via communication network(s) 102. Entertainment networks 116 include music enabled networks (e.g., Spotify, Pandora) and any other networks that provide entertainment content. Weather systems 118 include systems like Weather Underground and Yahoo Weather that generate weather data. Financial systems 120 include (for example) credit card transaction history and bank records.

Client 108 may be a personal computer and a monitor or mobile devices such the mobile devices described above. The mobile device will incorporate the same internal components and software as described above. Therefore, they will not be described here. Admin (administrator) 114 will have access to central system 104 via client 108 in order to control the operation of or provide service to the platform 200 for creating, browsing and searching a journal of a user's activities.

Figure 2:
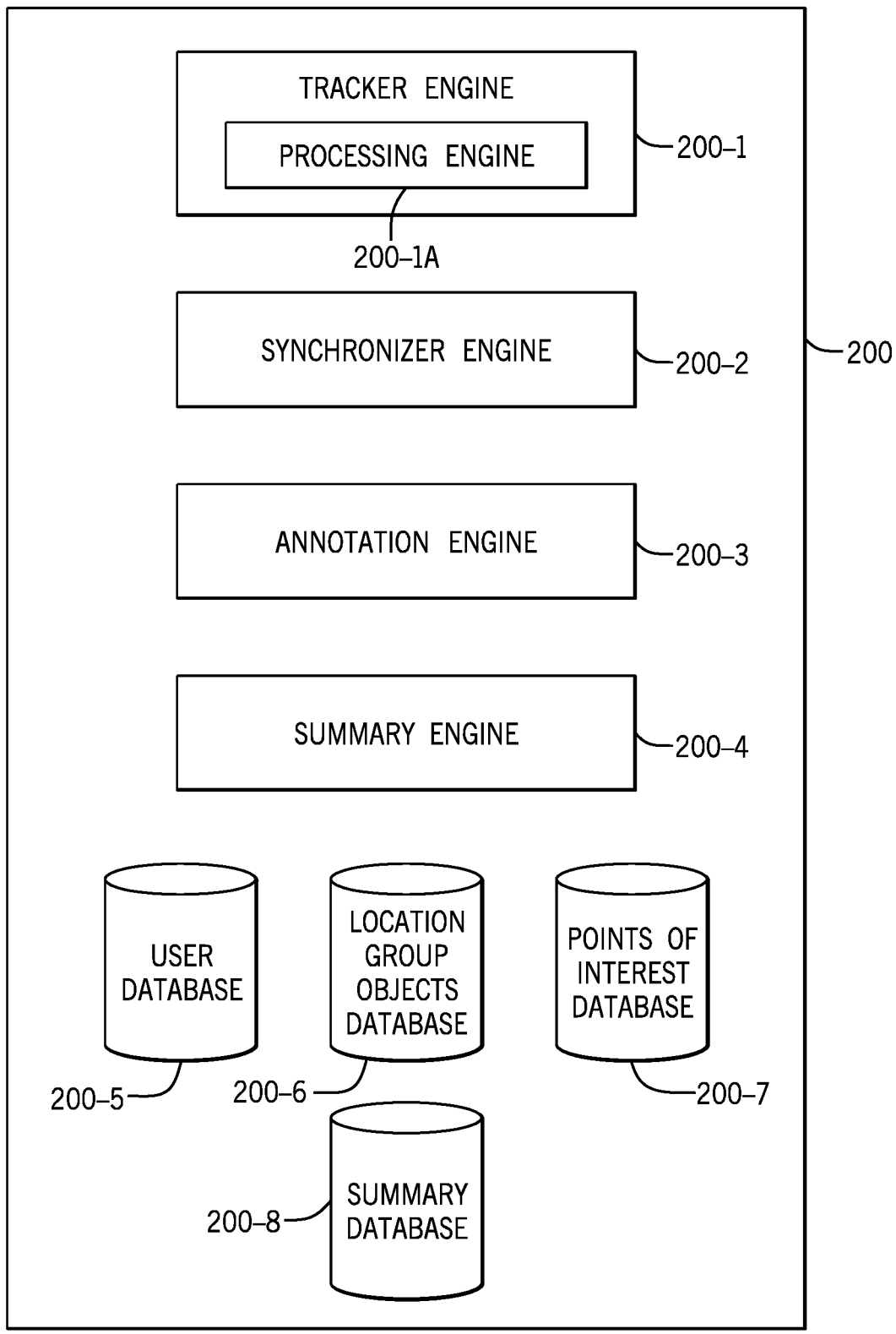
FIG. 2 depicts an architecture of the platform for creating, browsing and searching a journal of a user's activities.

FIG. 2 depicts an example architecture of platform 200 for creating, browsing and searching a journal of a user's activities. In particular, platform 200 comprises several software modules including tracker engine 200-1, synchronizer engine 200-2, annotation engine 200-3 and summary engine 200-4. Platform 200 further comprises several databases including user database 200-5, location group objects database 200-6, points in interest (POI) database 200-7, and summary database 200-8. In other embodiments, there may be additional or less modules and databases as known to those skilled in the art. In addition, the databases may be combined into any number of databases or the data may be stored in any other data structure.

Tracker engine 200-1 tracks and processes location and motion sensor data to generate a set of location group objects (or clusters) that consists of start time, end time, coordinates (location) and visits/transits as described in more detail below. Specifically, tracker engine 200-1 comprises processor engine that is configured to activate sensors (described in more detail below) on mobile device 106 and process data from such sensors. Sensors that may be activated as needed include GPS, step counter and altimeter to name a few. The GPS generates coordinate data (latitude, longitude and timestamp) as known to those skilled in the art. Step counter generates steps or distance data and altimeter generates altitude or elevation data as known to those skilled in the art. Processor engine processes the sensor data received from sensors to generate the location group objects.

Synchronizer engine 200-2 is configured to synchronize the location group object data generated by tracker engine 200-1 with the data stored in location group objects database 200-6 on central system 104.

Annotation engine 200-4 is configured to annotate (attach), i.e., assign a physical places/locations for each location group object relating to a user visit. Specifically, annotation engine 200-4 initially queries a database from Foursquare Instagram, Facebook, Google or similar source of points of interest information/data for the nearest 50 or so places/locations to the coordinate point that tracker engine 200 has determined. The Foursquare and/or other sourced data are stored along with point of interest physical locations in POI database 200-7. The points of interest data may be user specified favorites and other places as well as other user provided data. Annotation engine 200-3 calculates scores for each place/location that is function of a user's history with the specific place, the user's distance to a place, the hours of operation and the user's affinity for that place. In addition, the score will take into consideration data relating to other users that happen to be at the place at the same time. The function is preferably a linear combination of weighted features as known to those skilled in the art, but other functions maybe employed to achieve desired results. Once a physical place/location is determined (based on the score) and is attached to a coordinate (visit), annotation engine 200-3 will attach weather data, music, photos, email, texts, etc. to these assigned locations. Annotation engine 200-3 will keep track of a user's location history and will correlate it with their friends' recent location history. If two users (who are friends) are found to be in proximity, a tag is created in each of their journals. That is, annotation engine 200-3 will tag (collect) and store those individuals who spend time with the user. Every location group object will incorporate an outgoing link to a specific individual that is present with the user at the same location (place) at the same time.

Summary engine 200-4 is configured to generate summaries (reports) of a user's data from annotation engine 200-3 for creating a journal. Summary engine essentially works by analyzing various time-indexed data streams and correlating them based on their timestamps. For example, a report may be generated of a user's time in a particular city or at certain categories of places (e.g., bars, restaurants, museums).

User database 200-5 stores data relating to each user and their relationships or connections with other users. Location group objects database 200-6 stores location group objects generated by tracker engine 200-2 as described below. POI database 200-7 stores data relating places/locations received from a Foursquare, Instagram, Facebook, Google and/or other sourced database as well as user provided places/location and other sourced data. Summary database 200-8 stores reports that are generated that correlate data with data streams along a user's timeline.

Figure 3A:
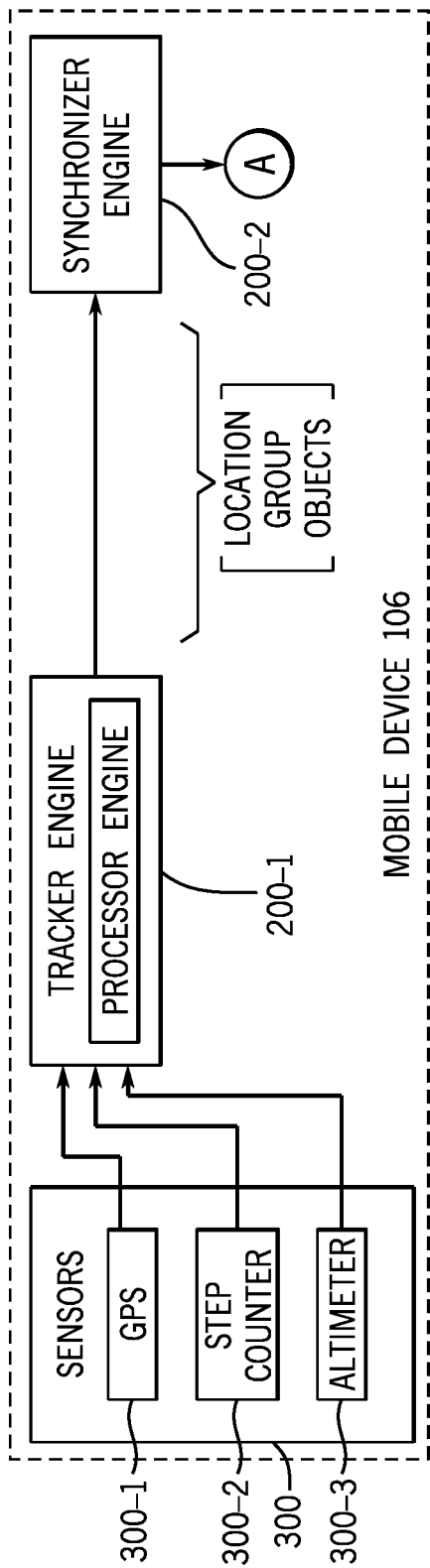
FIGS. 3A-3B depict an example of a data flow and the architecture for the platform for creating, browsing and searching a journal of a user's activities.
Figure 3B:
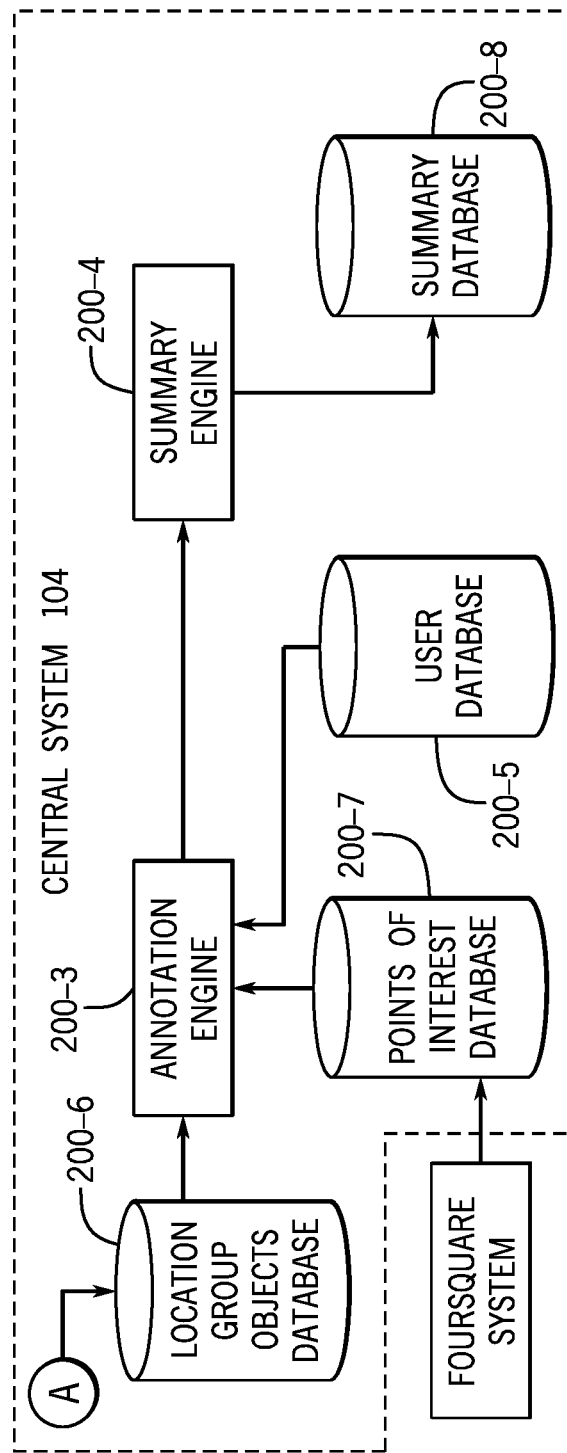

FIGS. 3A-3B depict an example of data flow with the architecture for the platform for creating, browsing and searching a journal of a user's activities. In particular, the flow or method steps begin with the tracker engine 200-1. As the user moves, tracker engine 200-1 tracks the users travels. Tracker engine 200-1 is configured to activate sensors 300 as needed and receive and process data therefrom to determine a user's location as well as status (i.e., whether the user is moving or stationary—visit). Examples of the sensors 300 include GPS 300-1, 300-2 and altimeter 300-3 as known to those skilled in the art. Any number of sensors may be employed to determine the location of a user throughout his or her journey as known to those skilled the art. In practice, tracker engine 200-1 receives coordinates from GPS sensor 300-1. If the GPS coordinates are accurate, the coordinates will be used as a location for the user. In order to determine GPS accuracy, tracker engine 200-1 will analyze the coordinates to determine if the coordinates are within a predefined radius, GPS access is poor, coordinate are obtained from GPS or actually the WIFI or cellular network and motion pattern inconsistent with achievable speeds, etc. If tracker engine 200-1 determines that the coordinates are not accurate, tracker engine 200-1 will activate the other sensors to corroborate the GPS coordinates with data from those other sensors to determine accuracy. For example, tracker engine 200-1 will analyze the steps between coordinate locations (step counter). If there isn't any sign of motion from the step counter or the accelerometer, it will treat a distant GPS reading as a low-accuracy point. If there is a sign of user motion, it will corroborate the GPS evidence and construct a new location group.

Tracker engine 200-1 via processing engine 200-1a processes the data from sensors 300 and generates a list of location group objects that comprise the start time, end time, coordinates and motion status as follow:

[start timestamp, end timestamp, coordinates, visit/transit]

User visits and transit parameters characterize the motion of the user as visiting (stationary) or moving. FIG. 4 depicts a chart illustrating an example list of location group objects. As shown for example, the user was stationary (visit) between 9 am and 9:30 am at coordinates 42, 75 (latitude and longitude).

Now, synchronizer engine 200-2, as discussed above, receives these objects and synchronizes them with the object data in the location group database 200-6 on central system 104. Current location and motion data are important for annotation engine 200-3 to operate.

Annotation engine 200-3 then assigns a physical location/place) and attaches people and other contextual information for these location groups. As indicated above, annotation engine 200-3 queries physical locations from Foursquare and/or other sourced data as well as user provided locations stored in the POI database 200-7. Annotation engine 200-3 then assigns a score to those physical locations based on a function of the user's location/place, distance to the location/place, hours of operation of location/place as well as other people (users) who happen to be at the location/place at the same time. (Annotation engine 200-3 also annotates the location group with tags of friends who may happen to be in the same place at the same time.)

Summary engine 200-4 generates summaries (reports) of a user's timeline as a journal and stores such summaries in summary database 200-8. For instance, if a user visits a new city say for example, Tokyo, summary engine 200-4 will create a new summary for Tokyo and associate all location groups objects with that city. Then, summary engine 200-4 will compute all the stats from those location groups (e.g., the number of people the user met in Tokyo, the number of photos the user took in Tokyo, the number of miles the user walked, etc.), and will construct a summary that is easily accessible. In short, summaries of timelines along with annotations are indexed so a user may search or browse (summaries) for the following: (1) people (e.g., a user's entire history with a particular person), (2) place (i.e., all the times a user visited a certain place), (3) cities (i.e., all the times a user visited a city, (4) categories (i.e., types of places do a user spends time, e.g., bar, restaurant, park, etc.), (5) travel (i.e., time spent running, walking, flying, etc.), and (6) trips (e.g., when user went to Rome in December). A user may also perform word searches and browsing via a mobile user interface.

In summary, system 100 provides real time access to a user's locations (along a timeline) as well as other user's locations. System 100 presents a user's moment experiences based on current location with greater precision as a result of the rich user location data and other users' location data.

In addition, system 100 may be configured to send notifications at any time (e.g., traffic information or subway wait time) based on real time location data from other users (using anonymous data from other users). System 100 may be configured to make recommendations, e.g., travel recommendations, locations the user has been. For example, one a user is near or in a hotel, system 100 may notify the user of restaurants. In addition, system 100 will enable real time request for data and receipt of such data. Requests may be entered by hand on a mobile device or via voice commands (e.g., via Siri, Elexa or any other voice recognition technology.)

Presentation. A user may search and browse any meaningful information associated with a user's timeline as desired. The desired information may be presented, for example as a heat map or pie chart of where or with whom the user spends time. The system described herein enables a user to search for anytime in his/her life, any person in his/her life or any location/place in his or her life. The system provides the ability to connect any data to a stream that has a timestamp. The data may be reconstructed over a lifetime or set time. That is, the index of time may include photos, email, texts, music or anything else that is linked to time in some way. The presentation may be part of platform 200 described herein or in any other third party application (as an enhancement).

It is to be understood that the disclosure teaches examples of the illustrative embodiments and that many variations of the invention can easily be devised by those skilled in the art after reading this disclosure and that the scope of the present invention is to be determined by the claims below.

What is claimed is:

1. A method of providing a platform for creating, browsing and searching in real time a journal of a user's activities, wherein the method is implemented in one or more servers on a network in communication with a first mobile device and a second mobile device of a first user and a second user, respectively, wherein the one or more servers are programmed to execute the method, the method comprising:
    receiving processed data from one or more sensors on each of the first and second mobile devices of the first and second users, respectively to determine locations of the first and second users throughout journeys of the first and second users;
    receiving a plurality of location group objects generated by the first and second mobile devices of the first and second users, respectively, based on the processed data from the one or more sensors on the first and second mobile devices, wherein each location group object of the plurality of location group objects comprises a time stamp, coordinates and/or motion status of each of the first and second users during journeys of each of the first and second user; and
    querying a database of points of interest data for locations in proximity to the coordinates of each of the plurality of location group objects of each of the first and second users during the journeys of each of the first and second user;
    assigning a score to each of the locations based on a function of the respective first or second users' location, distance to the location, hours of operation of location and/or other users that happen to be at the location at the same time;
    assigning a physical location to each of the plurality of location group objects based on the assigned score and storing data associated with the physical locations along with the coordinates of the plurality of location group objects to which the physical locations have been assigned as entries of journals that represents the journeys of the first and second users;
    correlating the data stored associated with the physical locations of the first user with the data stored associated with the physical locations of the second user to detect whether the first and second user are in proximity to same physical locations in substantially a same period of time, thereby determining if the first user and second user are present together at the same physical locations; and
    creating tags automatically in the entries of the journals of the first and second user upon the detection of the first and second users in proximity to the physical locations.

2. The method of claim 1 wherein creating tags includes generating (1) a first link in a location group object of the first user linking the second user to the first user that is present with the first user at the same physical location at substantially the same time and (2) a second link in a location group object of the second user linking the first user to the second user that is present with the first user at the same physical location at substantially the same time.

3. The method of claim 1 wherein assigning a physical location includes attaching people and/or other contextual information for the location group objects.

4. The method of claim 1 wherein receiving processed data from one or more sensors includes receiving GPS coordinates associated with locations of the first user and the second user during their journeys.

5. The method of claim 4 wherein the GPS coordinates are analyzed to determine accuracy.

6. The method of claim 5 wherein the GPS coordinates are analyzed to determine whether they are within a predefined radius.

7. The method of claim 4 wherein GPS coordinates are analyzed to detect motion of the user between locations.

8. The method of claim 1 wherein assigning a physical location includes querying physical locations from one or more data sources on the network including social networking platforms and/or user provided locations.

9. The method of claim 8 further comprising receiving the location group objects from a location group objects database that are synchronized with the first and second mobile devices.

10. The method of claim 1 further comprising correlating data associated with WIFI network communication, readings from the one or more sensors, altitude and/or motion of the first user during the first user's journey with data associated with WIFI network communication, readings from the one or more sensors, altitude and/or and motion of the second user during the second user's journey, in addition to correlating the stored data associated with the physical locations of the first and second users, to detect whether the first and second user are in proximity to same physical locations in substantially a same period of time, thereby determining if the first user and second user are present together at the same physical locations.

11. The method of claim 1 further comprising generating summaries of timelines of the first and second users' journals including computing information associated with all location group objects and indexing the summaries to enable the first or second user to search or browse the summaries, respectively.

12. A system for providing a platform for creating, browsing and searching a journal of a user's activities comprising:
    a data storage area to store:
        a user database, wherein information pertaining to one or more users is stored;
        a location group objects database, wherein one or more location group objects are stored, each object comprising a timestamp, coordinates and motion status of a user;
        a points of interest database wherein one or more location points of interest of the user are stored, the points of interest comprise data relating to the user from one or more data sources on a network that index data based on time; and
    one or more servers coupled to the user database, location group objects database and points of interest database via the network, the one or more servers in communication with first and second mobile devices of first and second users, respectfully, the one or more servers and/or the first and second mobile devices programmed to execute computer program modules, the computer program modules comprising:
    (a) a tracker engine configured to:
        (1) receive and process data from one or more sensors on the first and second mobile devices of first and second users, respectively, to determine locations of the first and second users throughout journeys of the first and second users;
        (2) generate a plurality of location group objects based on the data from the one or more sensors on first and second mobile devices, wherein each object comprises a time stamp, coordinates and/or motion status of each of the first and second users during journeys of each of the first and second user; and
        (3) query the points of interest database for points of interest data for locations in proximity to the coordinates of each of the plurality of location group objects of each of the first and second users during the journeys of each of the first and second user; and (b) an annotation engine configured to:
assign a score to each of the locations based on a function of the respective first and second users' locations, distance to the locations, hours of operation of locations and/or other users that happen to be at the locations at the same time;
assign a physical location for each of the location group objects based on the assigned score and storing data associated with the physical locations along with the coordinates of the location group objects to which the physical locations have been assigned as journal entries of the journeys of the first and second users;
correlating the data stored associated with the physical locations of the first user with the stored data associated with the physical locations of the second user to detect whether the first and second user are in proximity to at least one physical location of the physical locations in substantially a same period of time; and
automatically creating tags in the entries of the journals of the first and second users upon the detection of the first and second users in proximity of the at least one physical location.

13. The system of claim 12 wherein creating tags includes generating (1) a first link in a location group object of the first user linking the second user to the first user that is present with the first user at the same physical location at substantially the same time and (2) a second link in a location group object of the second user linking the first user to the second user that is present with the first user at the same physical location at substantially the same time.

14. The system of claim 12 wherein the one or more sensors includes a GPS sensor.

15. The system of claim 12 further comprising a summary engine configured to generate summaries of timelines of the first user as the journal of the first user and the second user as the journal of the second user, wherein the summary engine is configured to analyze time-indexed data from the timelines and correlate the data with locations of the first user and the second user.

16. The system of claim 15 wherein the summaries and annotations are indexed so as to enable the first user or the second user to search and browse for users, locations and/or types of locations the first user or the second user visited during their journeys.

17. A method of providing a platform for creating, browsing and searching in real time a journal of a user's activities, wherein the method is implemented in one or more servers on a network in communication with a first mobile device, a second mobile device and a third mobile device of a first user, second user and third user, respectively, wherein the one or more servers are programmed to execute the method, the method comprising:
receiving processed data from a plurality of sensors on each of the first, second and third mobile devices of the first, second and third users, respectively to determine locations of the first, second and third users throughout their journeys;
receiving a plurality of location group objects generated by each of the first and second mobile devices based on the processed data from the plurality of sensors on first, second and third mobile devices, wherein each location group object of the plurality of location group objects comprises a time stamp, coordinates and/or motion status of each of the first, second and third users during each of their journeys; and
querying a database of points of interest data for locations in proximity to the coordinates of each of the plurality of location group objects of each of the first, second and third users during each of their journeys;
assigning a score to each of the locations based on a function of the of the respective first, second and third users' location, distance to the location, hours of operation of location and/or other users that happen to be at the location at the same time;
assigning a physical location to each of the plurality of location group objects based on the assigned score and storing data associated with the physical locations along with the coordinates of the plurality of location group objects to which the physical locations have been assigned as entries of journals that represents the journeys of the first, second and third users;
correlating the data stored associated with the physical locations of the first user with the data stored associated with the physical locations of the second user to detect whether the first and second user are in proximity to same physical locations in substantially a same period of time, thereby determining if the first user and second user are present together at the same physical locations;
correlating the data stored associated with the physical locations of the first user with the data stored associated with the physical locations of the third user to detect whether the first and third user are in proximity to same physical locations in substantially a same period of time, thereby determining if the first user and third user are present together at the same physical locations;
creating tags automatically in the entries of the journals of the first and second user upon the detection of the first and second users in proximity to the physical locations; and
creating tags automatically in the entries of the journals of the first and third user upon the detection of the first and third users in proximity to the physical locations.

* * * * *